United States Patent
Kagy et al.

(10) Patent No.: US 9,887,856 B2
(45) Date of Patent: Feb. 6, 2018

(54) METHODS AND SYSTEMS FOR NETWORK SWITCH CONFIGURATION FOR A MODULAR COMPONENT CARRYING ONE OR MORE INFORMATION HANDLING SYSTEMS

(71) Applicant: Dell Products L.P., Round Rock, TX (US)

(72) Inventors: Carl W. Kagy, Austin, TX (US); Christopher Abella Poblete, Austin, TX (US); Scott Michael Ramsey, Cedar Park, TX (US); Wayne Robert Weilnau, Jr., Austin, TX (US)

(73) Assignee: Dell Products L.P., Round Rock, TX (US)

( * ) Notice: Subject to any disclaimer, the term of this patent is extended or adjusted under 35 U.S.C. 154(b) by 95 days.

(21) Appl. No.: 14/100,391

(22) Filed: Dec. 9, 2013

(65) Prior Publication Data
US 2015/0160690 A1    Jun. 11, 2015

(51) Int. Cl.
G06F 1/16 (2006.01)
H04L 12/64 (2006.01)
H04L 12/403 (2006.01)
H04L 12/931 (2013.01)

(52) U.S. Cl.
CPC ........ H04L 12/6418 (2013.01); H04L 12/403 (2013.01); H04L 49/00 (2013.01); H04L 49/405 (2013.01); H04L 49/70 (2013.01)

(58) Field of Classification Search
CPC .............................. G06F 1/16; H04L 12/6418
See application file for complete search history.

(56) References Cited

U.S. PATENT DOCUMENTS

| | | | |
|---|---|---|---|
| 8,244,842 B1* | 8/2012 | Simons | H04L 41/022 709/217 |
| 2004/0081104 A1* | 4/2004 | Pan et al. | 370/254 |
| 2005/0265385 A1* | 12/2005 | Cromer | G06F 13/24 370/466 |

(Continued)

OTHER PUBLICATIONS

International Search Report and Written Opinion, International Patent Application No. PCT/US2014/014140, dated May 14, 2014, 8 pages.

*Primary Examiner* — Ario Etienne
*Assistant Examiner* — Elizabeth Kassa
(74) *Attorney, Agent, or Firm* — Jackson Walker L.L.P.

(57) ABSTRACT

A method may include, receiving, by a controller integral to a chassis, a user request to apply a switch configuration. The method may also include communicating from the controller to a remote access controller (RAC) integral to at least one module disposed in a plurality of slots of the chassis an indication that a user has requested application of a switch configuration. The method may further include receiving at the controller, in response to the indication, a request to download a switch configuration file from the controller to the RAC. The method may additionally include transferring from the controller, in response to the request to download the switch configuration file, the switch configuration file to the RAC such that the RAC applies parameters set forth in the switch configuration file in order to configure an in-band switch associated with the module comprising the RAC.

16 Claims, 6 Drawing Sheets

(56) References Cited

U.S. PATENT DOCUMENTS

| | | | |
|---|---|---|---|
| 2006/0190532 A1* | 8/2006 | Chadalavada | G06F 21/6218 709/203 |
| 2006/0215659 A1* | 9/2006 | Rothman | H04L 41/12 370/392 |
| 2006/0233174 A1* | 10/2006 | Rothman | H04L 45/28 370/392 |
| 2008/0052436 A1* | 2/2008 | Sharma | G06F 13/4063 710/301 |
| 2010/0299419 A1* | 11/2010 | Ramankutty et al. | 709/221 |
| 2012/0063299 A1* | 3/2012 | Narasimhan et al. | 370/218 |
| 2012/0272033 A1* | 10/2012 | Murphy et al. | 711/171 |
| 2013/0111095 A1* | 5/2013 | Mehrotra | H04L 12/4641 710/301 |
| 2013/0346667 A1* | 12/2013 | Stroud | G06F 13/385 710/316 |
| 2014/0298007 A1* | 10/2014 | Rukmangathan | H04L 63/0876 713/153 |

\* cited by examiner

METHODS AND SYSTEMS FOR NETWORK SWITCH CONFIGURATION FOR A MODULAR COMPONENT CARRYING ONE OR MORE INFORMATION HANDLING SYSTEMS

TECHNICAL FIELD

The present disclosure relates to modular information handling systems. More specifically, embodiments of the disclosure provide systems and methods for deploying network switch configuration information for a modular chassis drawer for carrying one or more information handling systems configured to be disposed in a chassis configured to receive the modular chassis drawer.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Existing server architectures either provide a single monolithic server capable of running one operating system (or a single hypervisor running multiple virtualized operating systems) and input/output ("I/O") resources at a time, or bulky blade server chassis providing multiple servers and I/O control modules in a single chassis. A system chassis with multiple information handling systems with various peripheral and I/O capabilities common to the chassis as a whole may provide advantages, as it allows a blade server chassis in a small form factor, thereby providing a blade server chassis with a size comparable to the size of a monolithic server. Implementation of a system chassis with multiple information handling systems with various peripheral and I/O capabilities common to the chassis as a whole presents numerous challenges.

SUMMARY

In accordance with the teachings of the present disclosure, the disadvantages and problems associated with traditional approaches to configuring network switches for information handling systems in a modular chassis have been substantially reduced or eliminated.

In accordance with embodiments of the present disclosure, a chassis may include a plurality of slots and a controller communicatively coupled to the plurality of slots. The plurality of slots may each configured to receive a module having one or more information handling systems, wherein each slot is configured to electrically and communicatively couple the module to other components of the chassis. The controller may be configured to receive a user request to apply a switch configuration and communicate to a remote access controller integral to at least one module disposed in the plurality of slots an indication that a user has requested application of a switch configuration. The controller may also be configured to receive, in response to the indication, a request to download a switch configuration file from the controller to the remote access controller. The controller may further be configured to transfer, in response to the request to download the switch configuration file, the switch configuration file to the remote access controller such that the remote access controller applies parameters set forth in the switch configuration file in order to configure an in-band switch associated with the module comprising the remote access controller.

In accordance with these and other embodiments of the present disclosure, a method may include, in a chassis having a plurality of slots each configured to receive a module having one or more information handling systems wherein each slot is configured to electrically and communicatively couple the module to other components of the chassis, receiving, by a controller integral to the chassis, a user request to apply a switch configuration. The method may also include communicating from the controller to a remote access controller integral to at least one module disposed in the plurality of slots an indication that a user has requested application of a switch configuration. The method may further include receiving at the controller, in response to the indication, a request to download a switch configuration file from the controller to the remote access controller. The method may additionally include transferring from the controller, in response to the request to download the switch configuration file, the switch configuration file to the remote access controller such that the remote access controller applies parameters set forth in the switch configuration file in order to configure an in-band switch associated with the module comprising the remote access controller.

In accordance with these and other embodiments of the present disclosure, a module configured to removably engage with a slot of a chassis, wherein the slot is configured to receive the module and to electrically and communicatively couple the module to other components of the chassis, may include at least one information handling system comprising a processor, an in-band switch for switching network traffic between the at least one information handling system and a network external to the chassis, and a remote access controller communicatively coupled to the in-band switch. The remote access controller may be configured to receive from a controller integral to the chassis and external to the module an indication that a user has communicated to the controller a request to apply a switch configuration. The remote access controller may also be configured to download, in response to the indication, a switch configuration file from the controller to the remote access controller. The remote access controller may further be configured to apply parameters set forth in the switch configuration file in order to configure the in-band switch for communication.

In accordance with these and other embodiments of the present disclosure, a method may include, in a module configured to removably engage with a slot of a chassis, wherein the slot is configured to receive the module and to electrically and communicatively couple the module to other components of the chassis and wherein the module comprises at least one information handling system comprising a processor, an in-band switch for switching network traffic between the at least one information handling system and a network external to the chassis, and a remote access controller communicatively coupled to the in-band switch, the method comprising, receiving from a controller integral to the chassis and external to the module an indication that a user has communicated to the controller a request to apply a switch configuration. The method may also include downloading, in response to the indication, a switch configuration file from the controller to the remote access controller. The method may further include applying parameters set forth in the switch configuration file in order to configure the in-band switch for communication.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-6, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more busses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

In this disclosure, the term "information handling resource" may broadly refer to any component system, device or apparatus of an information handling system, including without limitation processors, busses, memories, input-output devices and/or interfaces, storage resources, network interfaces, motherboards, electro-mechanical devices (e.g., fans), displays, and power supplies.

Figure 1:
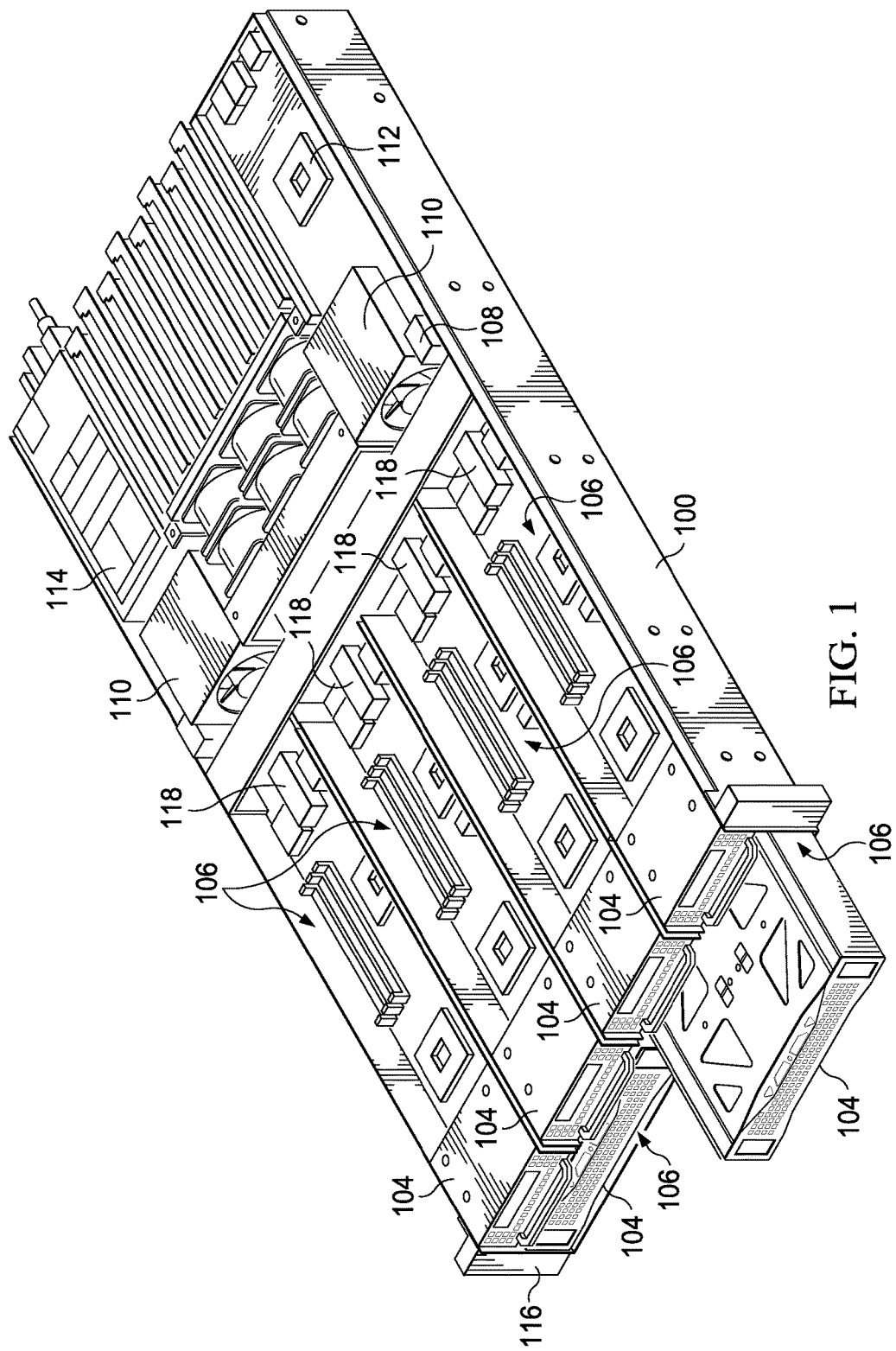
FIG. 1 illustrates a cut-away perspective view of a chassis for receiving modular information handling resources, in accordance with embodiments of the present disclosure.

FIG. 1 illustrates a perspective view of a chassis 100 for receiving modular information handling resources, in accordance with embodiments of the present disclosure, with certain elements (e.g., walls for enclosing components within chassis 100) cut-away or removed in order to show information handling resources internal to chassis 100. Chassis 100 may be an enclosure that serves as a container for various information handling systems and information handling resources, and may be constructed from steel, aluminum, plastic, and/or any other suitable material. Although the term "chassis" is used, chassis 100 may also be referred to as a case, cabinet, tower, box, enclosure, and/or housing. In certain embodiments, chassis 100 may be configured to hold and/or provide power to a plurality of information handling systems and/or information handling resources. As depicted in FIG. 1, chassis 100 may include one or more slots 106 configured to receive drawers 104 for carrying information handling resources, as described in greater detail below. For example, some drawers 104 may include one or more information handling systems. As another example, some drawers 104 may include one or more peripherals (e.g., hard disk drives, graphics processing units, etc.) associated with information handling systems disposed in another drawer 104.

Each drawer 104 may include an interface connector 118 configured to electrically couple to a midplane 108, thus providing electrical coupling between information handling resources carried on the various drawers 104 to each other and/or one or more networks or devices external to chassis 100. Midplane 108 may comprise any system, device, or apparatus configured to interconnect information handling resources of chassis 100 with each other. Accordingly, midplane 108 may include slots, pads, and/or other connectors configured to receive corresponding electrical connectors of information handling resources in order to electrically couple information handling systems disposed in drawers 104 and/or information handling resources to each other.

A chassis management controller (CMC) 112 may be communicatively coupled to midplane 108 and may comprise any system, device, or apparatus configured to facilitate management and/or control of components of chassis 100, information handling systems modularly coupled within, and/or one or more of its component information handling resources. CMC 112 may be configured to issue commands and/or other signals to manage and/or control information handling systems coupled to slots 106 and/or information handling resources of chassis 100. CMC 112 may comprise a microprocessor, microcontroller, DSP, ASIC, field programmable gate array ("FPGA"), EEPROM, or any combination thereof.

In addition or alternatively, CMC 112 may also provide a management console for user/administrator access to these functions. For example, CMC 112 may provide for communication with a user interface (e.g., user interface 116), permitting a user to interact with CMC 112 and configure control and management of components of chassis 100 by CMC 112. As another example, CMC 112 may implement Web Services Management ("WS-MAN") or another suitable management protocol permitting a user to remotely access a CMC 112 to configure chassis 100 and its various information handling resources. In such embodiments, a CMC 112 may interface with a network interface separate from a traditional network interface of chassis 100, thus allowing for "out-of-band" control of chassis 100, such that communications to and from CMC 112 are communicated via a management channel physically isolated from an "in band" communication channel with the traditional network interface. Thus, for example, if a failure occurs in chassis 100 that prevents an administrator from interfacing with chassis 100 via a traditional network interface and/or user interface 116 (e.g., operating system failure, power failure, etc.), the administrator may still be able to monitor and/or manage chassis 100 (e.g., to diagnose problems that may have caused failure) via CMC 112. In the same or alternative embodiments, CMC 112 may allow an administrator to remotely manage one or more parameters associated with operation of chassis 100 and its various information handling resources (e.g., power usage, processor allocation, memory allocation, security privileges, etc.).

One or more air movers 110 may be communicatively coupled to CMC 112, and may include any mechanical or electro-mechanical system, apparatus, or device operable to move air and/or other gasses. In some embodiments, an air mover 110 may comprise a fan (e.g., a rotating arrangement of vanes or blades which act on the air). In other embodiments, an air mover 110 may comprise a blower (e.g., a centrifugal fan that employs rotating impellers to accelerate air received at its intake and change the direction of the airflow). In these and other embodiments, rotating and other moving components of an air mover 110 may be driven by a motor. The rotational speed of such motor may be controlled by one or more control signals communicated from CMC 112. In operation, an air mover 110 may cool information handling systems and information handling resources of chassis 100 by drawing cool air into chassis 100 from outside chassis 100, expel warm air from inside chassis 100 to the outside of chassis 100, and/or move air across one or more heatsinks (not explicitly shown) internal to chassis 100 to cool one or more information handling systems and/or information handling resources. Although FIG. 1 depicts chassis 100 as having two air movers 110, chassis 100 may include any suitable number of air movers 110.

As shown in FIG. 1, chassis 100 may include one or more power supplies 114. Generally speaking, a power supply 114 may include any system, device, or apparatus configured to supply electrical current to one or more information handling resources within chassis 100.

A user interface 116 may include any system, apparatus, or device via which a user may interact with chassis 100 and its various components by facilitating input from a user allowing the user to manipulate chassis 100 and output to a user allowing chassis 100 to indicate effects of the user's manipulation. For example, user interface 116 may include a display suitable for creating graphic images and/or alphanumeric characters recognizable to a user, and may include, for example, a liquid crystal display, a cathode ray tube, a plasma screen, and/or a digital light processor projection monitor. In certain embodiments, such a display may be an integral part of chassis 100 and receive power from one or more power supplies 114 of chassis 100, rather than being coupled to chassis 100 via a cable. In some embodiments, such display may comprise a touch screen device capable of receiving user input, wherein a touch sensor may be mechanically coupled or overlaid upon the display and may comprise any system, apparatus, or device suitable for detecting the presence and/or location of a tactile touch, including, for example, a resistive sensor, capacitive sensor, surface acoustic wave sensor, projected capacitance sensor, infrared sensor, strain gauge sensor, optical imaging sensor, dispersive signal technology sensor, and/or acoustic pulse recognition sensor. In these and other embodiments, user interface 116 may include other user interface elements (e.g., a keypad, buttons, and/or switches placed in proximity to a display) allowing a user to provide input to chassis 100. In these and other embodiments, user interface 116 may include one or more visual indicators, such as light-emitting diodes, for example, for communicating information to a user. User interface 116 may be coupled to CMC 112 and/or other components of chassis 100, and thus may allow a user to configure various information handling systems and/or information handling resources of chassis 100.

Figure 2:
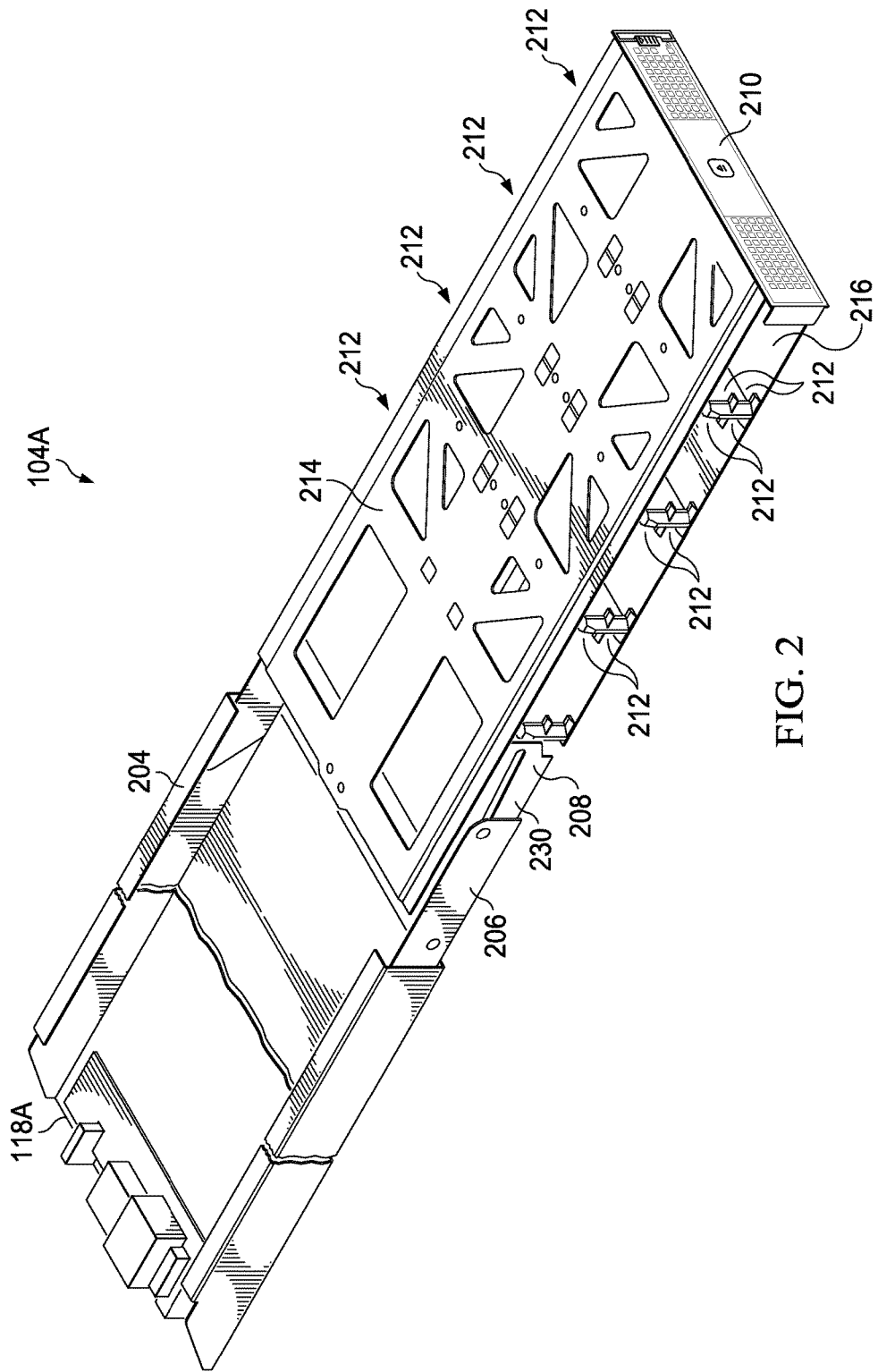
FIG. 2 illustrates a perspective view of an example chassis drawer for carrying modular information handling resources, the drawer in an open position, in accordance with embodiments of the present disclosure.
Figure 3:
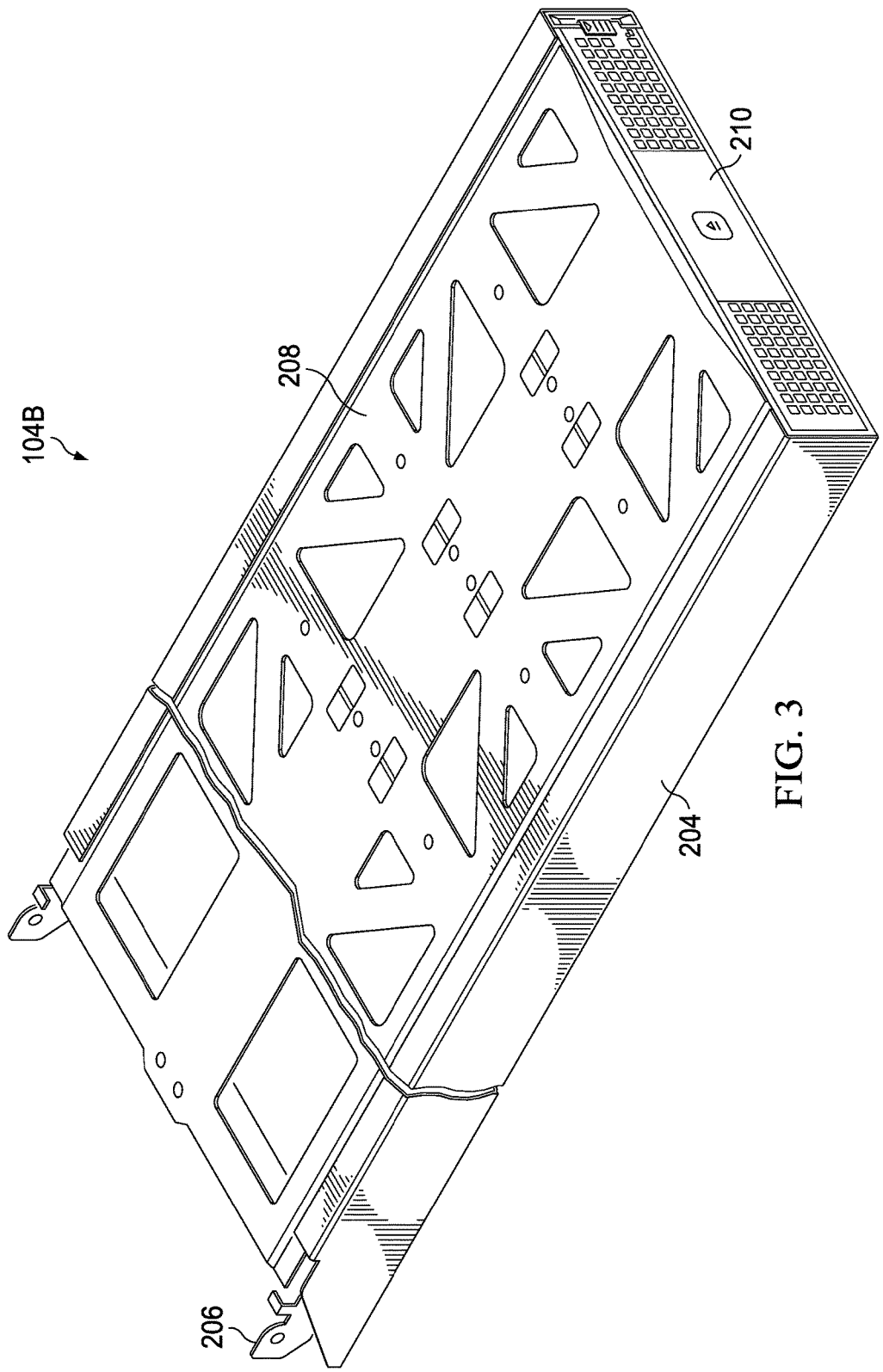
FIG. 3 illustrates a perspective view of an example chassis drawer for carrying modular information handling resources, the drawer in a closed position, in accordance with embodiments of the present disclosure.

FIGS. 2 and 3 depict various views of an example chassis drawer 104A for carrying modular information handling resources, in accordance with embodiments of the present disclosure. FIG. 2 illustrates a perspective view of an example chassis drawer 104A for carrying modular information handling resources, wherein drawer 104A is in an open position drawn from chassis 100, in accordance with embodiments of the present disclosure. FIG. 3 illustrates a perspective view of chassis drawer 104A for carrying modular information handling resources, wherein drawer 104A is in a closed position relative to chassis 100, in accordance with embodiments of the present disclosure.

As shown in FIGS. 2 and 3, chassis drawer 104A may comprise an inner member 204, an intermediate member 206 mechanically coupled to inner member 204, and a carrier member 208 mechanically coupled to intermediate member 206. Inner member 204 may be constructed from steel, aluminum, plastic, and/or any other suitable material. Although inner member 204 may have any suitable size and/or shape, inner member 204 is depicted in the embodiments of FIGS. 2 and 3 as having two substantially planar and parallel opposite sides defining a drawer height coupled to each other by a substantially planar bottom generally perpendicular to the sides defining a drawer width and a guide flange extending from and running perpendicular to and along the length of each side such that the flanges project towards each other. In some embodiments, inner member 204 may be mechanically coupled to the internal mechanical structure of chassis 100, such that inner member 204 is fixed relative to chassis 100.

Intermediate member 206 may be constructed from steel, aluminum, plastic, and/or any other suitable material. Although intermediate member 206 may have any suitable size and/or shape, intermediate member 206 is depicted in the embodiments of FIGS. 2 and 3 as having two generally parallel and planar opposite sides coupled to each other by a substantially planar bottom generally perpendicular to the sides. The height of the sides and the width of the bottom may be such that the corresponding sides and bottom of inner member 204 provide a mechanical guide for intermediate member 206 as chassis drawer 104A is opened and closed. Intermediate member 206 may be mechanically coupled to inner member 204 via bearings and/or other mechanical components such that intermediate member 206 may slide relative to inner member 204 in a direction perpendicular to the drawer height and drawer width defined by inner member 204. In some embodiments, intermediate member 206 may be limited in the distance it may be drawn from chassis 100 through any combination of suitable structural elements. Similarly, in some embodiments, other mechanical components may restrict motion of intermediate member 206 relative to inner member 204 as chassis drawer 104A is translated from the open position to the closed position.

Carrier member 208 may be constructed from steel, aluminum, plastic, and/or any other suitable material. Although carrier member 208 may have any suitable size and/or shape, carrier member 208 is depicted in the embodiments of FIGS. 2 and 3 as having a substantially planar top 214 and a substantially planar bottom 216 generally parallel to each other defining a width and depth of carrier member 208, the top 214 and bottom 216 mechanically coupled to each other by one or more structural elements defining a height of carrier member 208, such that top 214 and bottom 216 are generally perpendicular to the sides of intermediate member 206. Carrier member 208 may also include a face 210 mechanically affixed to top 214 and/or bottom 216. As shown in FIGS. 2 and 3, top 214 may include one or more openings (e.g., above bays 212) allowing for gaseous fluid to pass through. Similarly, bottom 216 may also include one or more openings (e.g., below bays 212) allowing for gaseous fluid to pass through.

In some embodiments, face 210 may be substantially equal in width to the width of carrier member 208 and substantially equal to the height of carrier member 208. In these and other embodiments, face 210 may include handles, pull tabs, and/or other features allowing a person to pull on face 210 in order to translate chassis drawer 104A from a closed position to an open position in a direction generally parallel to the depth of top 214 and bottom 216. In these and other embodiments, face 210 may include a grill, vent, and/or other opening allowing gaseous fluid to enter and/or exit through face 210.

As shown in FIG. 2, each side of carrier member 208 (e.g., portions of carrier member 208 between the edges of and substantially parallel to top 214 and bottom 216) may include a web 230 configured to mechanically couple carrier member 208 to intermediate member 206, as well as openings for a plurality of bays 212.

Each of the various bays 212 defined by drawer 104A may include one or more electrical components for coupling an information handling resource (e.g., a hard disk drive) inserted into such bay 212 to other information handling resources of chassis 100. For example, a backplane (not explicitly shown) may couple a modular information handling resource disposed in a bay 212 to interface connector 118A, which, as described above, may in turn be coupled to midplane 108. In some embodiments, the various information handling resources may be coupled to interface connector 118A such that when chassis drawer 104A is drawn open relative to chassis 100, such information handling resources maintain electrical conductivity to interface connector 118A and interface connector 118A may maintain electrical conductivity to midplane 108, thus permitting insertion or removal of an information handling resource without affecting operation of other information handling resources carried by chassis drawer 104A. In such embodiments, interface connector 118A may only be decoupled from midplane 108 when the entirety of chassis drawer 104A is removed from chassis 100.

Figure 4:
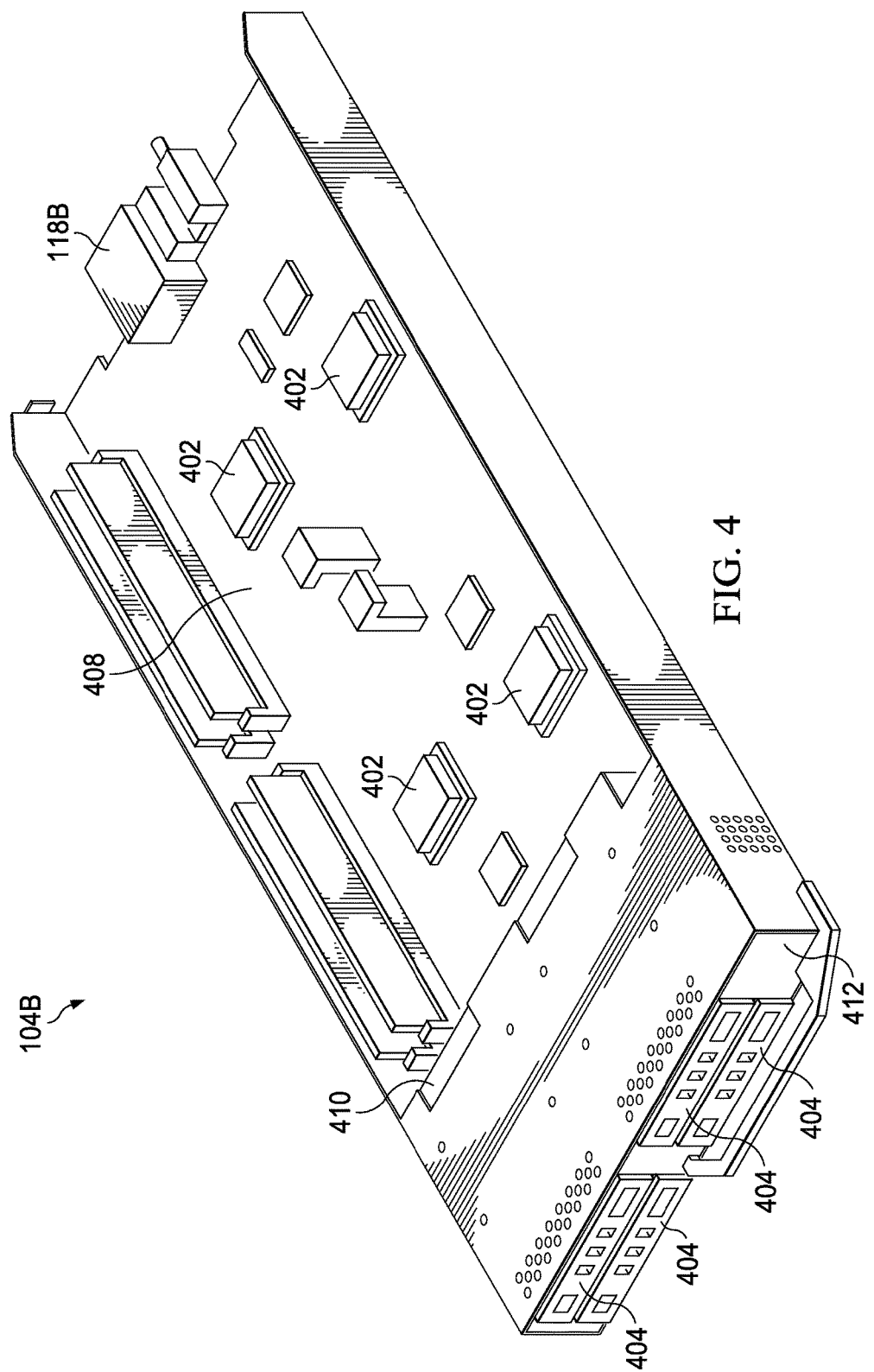
FIG. 4 illustrates a perspective view of another example chassis drawer for carrying information handling resources, in accordance with embodiments of the present disclosure.

FIG. 4 illustrates a perspective view of another example chassis drawer 104B for carrying information handling resources, in accordance with embodiments of the present disclosure. Although not labeled in detail as in FIGS. 2 and 3, chassis drawer 104B may include one or more mechanical and/or structural elements (e.g., similar or identical to inner member 204, intermediate member 206, and carrier member 208) for translating chassis drawer 104B between open and closed positions relative to chassis 100. Similar to chassis drawer 104A, the various information handling resources carried by chassis drawer 104B may be coupled to interface connector 118B such that when chassis drawer 104B is drawn open relative to chassis 100, such information handling resources maintain electrical conductivity to interface connector 118B and interface connector 118B may maintain electrical conductivity to midplane 108, thus permitting insertion or removal of an information handling resource without affecting operation of other information handling resources carried by chassis drawer 104B. In such embodiments, interface connector 118B may only be decoupled from midplane 108 when the entirety of chassis drawer 104B is removed from chassis 100.

In the particular chassis drawer 104B depicted in FIG. 4, a backplane 408 may have thereon a plurality (e.g., four) of processors 402 and a chipset associated with each processor 402, thus defining four independent information handling systems carried by chassis drawer 104B. Interface connector 118B may also be coupled to backplane 408, thus coupling processors 402 to information handling resources of chassis 100 external to chassis drawer 104B. In addition, the particular chassis drawer 104B depicted in FIG. 4 may include a plurality (e.g., four) of hard disk drives 404 communicatively coupled to backplane 408 (and thus one or more of processors 402) via a drive backplane 410.

As shown in FIG. 4, chassis drawer 104B may comprise a user interface 412. User interface 412 may include any system, apparatus, or device via which a user may interact with compute nodes (e.g., via a remote access controller such as an Integrated Dell Remote Access Controller or "iDRAC" for example) of chassis drawer 104B and its various components by facilitating input from a user allowing the user to compute nodes and to indicate effects of the user's manipulation. For example, user interface 412 may include a display suitable for creating graphic images and/or alphanumeric characters recognizable to a user, and may include, for example, a liquid crystal display, a cathode ray tube, a plasma screen, and/or a digital light processor projection monitor. In some embodiments, such display may comprise a touch screen device capable of receiving user input, wherein a touch sensor may be mechanically coupled or overlaid upon the display and may comprise any system, apparatus, or device suitable for detecting the presence and/or location of a tactile touch, including, for example, a resistive sensor, capacitive sensor, surface acoustic wave sensor, projected capacitance sensor, infrared sensor, strain gauge sensor, optical imaging sensor, dispersive signal technology sensor, and/or acoustic pulse recognition sensor. In these and other embodiments, user interface 412 may include other user interface elements (e.g., a keypad, buttons, and/or switches placed in proximity to a display) allowing a user to provide input to one or more compute nodes of chassis drawer 104B. In these and other embodiments, user interface 412 may include one or more visual indicators, such as light-emitting diodes, for example, for communicating information to a user.

Although FIGS. 2-4 depict particular example chassis drawers 104, chassis drawers 104 with other configurations may be employed consistent with the systems and methods herein disclosed. For example, in some embodiments, a chassis drawer 104 similar to that of chassis drawer 104B may include only one processor, such that the chassis drawer includes one compute node.

A particular challenge of a modular chassis, such as chassis 100, is configuring network configuration parameters for the individual information handling systems that are formed by processors 402 and other information handling resources of the various chassis drawers 104 installed in chassis 100. Typically, such configuration must be manually performed, which is time consuming and prone to error. Such challenge is further exacerbated in an enterprise with multiple chasses each having multiple information handling systems instantiated therein.

Figure 5:
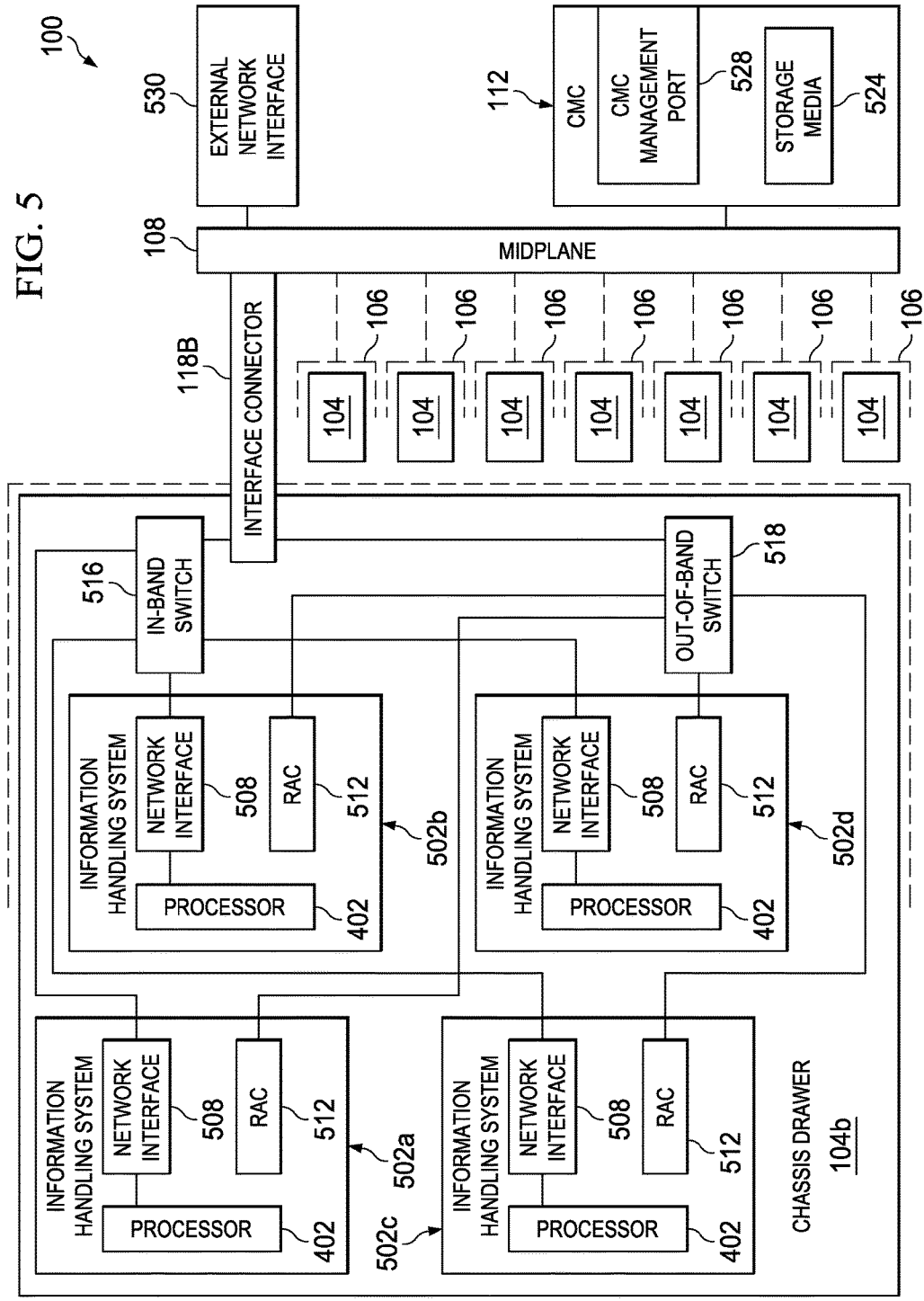
FIG. 5 illustrates an example functional block diagram of the chassis depicted in FIG. 1 including a chassis drawer carrying a plurality of information handling systems, in accordance with embodiments of the present disclosure.

FIG. 5 illustrates an example functional block diagram of chassis 100 depicted in FIG. 1, wherein chassis 100 has disposed in one of its slots 106 a chassis drawer 104B carrying a plurality of information handling systems 502, in accordance with embodiments of the present disclosure. As shown in FIG. 5, chassis 100 may include other chassis drawers 104, wherein such chassis drawers 104 may carry information handling systems, hard disk drives, and/or other information handling resources which may or may not be similar to chassis drawers 104A and 104B described above.

As shown in FIG. 5, chassis drawer 104B may include a plurality of information handling systems 502 (e.g., 502a-d), each of which may comprise a server or other suitable computing node, an in-band switch 516, and an out-of-band switch 518. Among other components, an information handling system 502 may comprise a processor 402, a network interface 508 communicatively coupled to its associated processor 402, and a remote access controller (RAC) 512.

A processor 402 may include any system, device, or apparatus configured to interpret and/or execute program instructions and/or process data, and may include, without limitation, a microprocessor, microcontroller, digital signal processor ("DSP"), application specific integrated circuit ("ASIC"), or any other digital or analog circuitry configured to interpret and/or execute program instructions and/or process data. In some embodiments, processor 402 may interpret and/or execute program instructions and/or process data stored in a memory or other computer-readable media accessible to processor 402.

A network interface 508 may comprise any suitable system, apparatus, or device operable to serve as an interface between an associated information handling system 502 and a private communication network internal to chassis drawer 104B formed by information handling systems 502 and in-band switch 516. Network interface 508 may enable an associated information handling system 502 to communicate using any suitable transmission protocol and/or standard. In some embodiments, network interface 508 may comprise one or more network interface cards, or "NICs." In other embodiments, network interface 508 may comprise one or more local area network (LAN)-on-motherboard (LOM) devices. In these and other embodiments, network interface 508 may include a plurality of NICs, LOMs, or other network interface devices, in order to provide communication redundancy or robustness.

A RAC 512 may be implemented by, for example, a microprocessor, microcontroller, DSP, ASIC, EEPROM, or any combination thereof. RAC 512 may be configured to communicate with CMC 112. Such communication may be made, for example, via private management network fabric implemented using out-of-band switch 518. RAC 512 may be configured to provide out-of-band management facilities for management of an associated information handling system 502. Such management may be made by CMC 112 even if information handling system 502 is powered off or powered to a standby state. A RAC 512 may include a processor, memory, and network connection separate from the rest of its associated information handling system 502. In certain embodiments, a RAC 502 may include or may be an integral part of a baseboard management controller (BMC), Dell Remote Access Controller (DRAC) or an Integrated Dell Remote Access Controller (iDRAC).

In-band switch 516 may comprise any system, device, or apparatus configured to couple network interfaces 508 of information handling systems 502 to external network interface 530 and perform switching between network interfaces 508 and an external communication network communicatively coupled to external network interface 530 based on a network configuration of various ports (not explicitly shown) of network interfaces 508, in-band switch 516, and external network interface 530, as described in greater detail below. In-band switch 516 may comprise a network switch, Ethernet switch, PCIe switch, a generalized PC bus switch, an Infiniband switch, or other suitable switch.

Similarly, out-of-band switch 518 may comprise any system, device, or apparatus configured to couple RACs 512 of information handling systems 502 to CMC 112 and perform switching between RACs 512 and CMC 112 in order to provide for centralized management of individual information handling systems 502 via a management console coupled to CMC 112 (e.g., via CMC management port 528).

As shown in FIG. 5, an external network interface 530 may be communicatively coupled to midplane 108. External network interface 530 may comprise any suitable system, apparatus, or device operable to serve as an interface between chassis 100 and a network external to chassis 100. External network interface 530 may enable information handling systems 502 to communicate with such external network using any suitable transmission protocol and/or standard. In some embodiments, external network interface 530 may comprise one or more network interface cards, or "NICs." In other embodiments, external network interface 530 may comprise one or more input/output module (IOM) devices. In these and other embodiments, external network interface 530 may include a plurality of NICs, IOMs, or other network interface devices, in order to provide communication redundancy or robustness.

In addition, as shown in FIG. 5, CMC 112 may include storage media 524 and a CMC management port 528. Storage media 524 may include any system, device, or apparatus configured to retain program instructions and/or data for a period of time (e.g., computer-readable media). Storage media 524 may include RAM, EEPROM, a PCM-CIA card, flash memory, magnetic storage, opto-magnetic storage, or any suitable selection and/or array of volatile or non-volatile memory that retains data after power to CMC 112 is turned off.

CMC management port 528 may serve as a network interface between CMC 112 and a remote management console configured to allow a user to remotely manage components of chassis 100 via an out-of-band network physically isolated from an in-band network coupled to external network interface 530. CMC management port 528 may communicate with such remote management console via any suitable management protocol or standard, including without limitation Intelligent Platform Management Interface (IPMI) and Simple Network Management Protocol (SNMP).

Historically, port configuration of an in-band switch (e.g., in-band switch 516) is performed by a RAC (e.g., RAC 512). However, in a distributed server architecture such as may be present in chassis 100, it may be desirable that port configuration of all elements of chassis 100 be logically and centrally managed by CMC 112 for the sake of management simplicity. Accordingly, approaches may be desirable in which devices, including in-band switch 516, may be physically controlled by a RAC 512 but logically owned and controlled by CMC 112.

Figure 6:
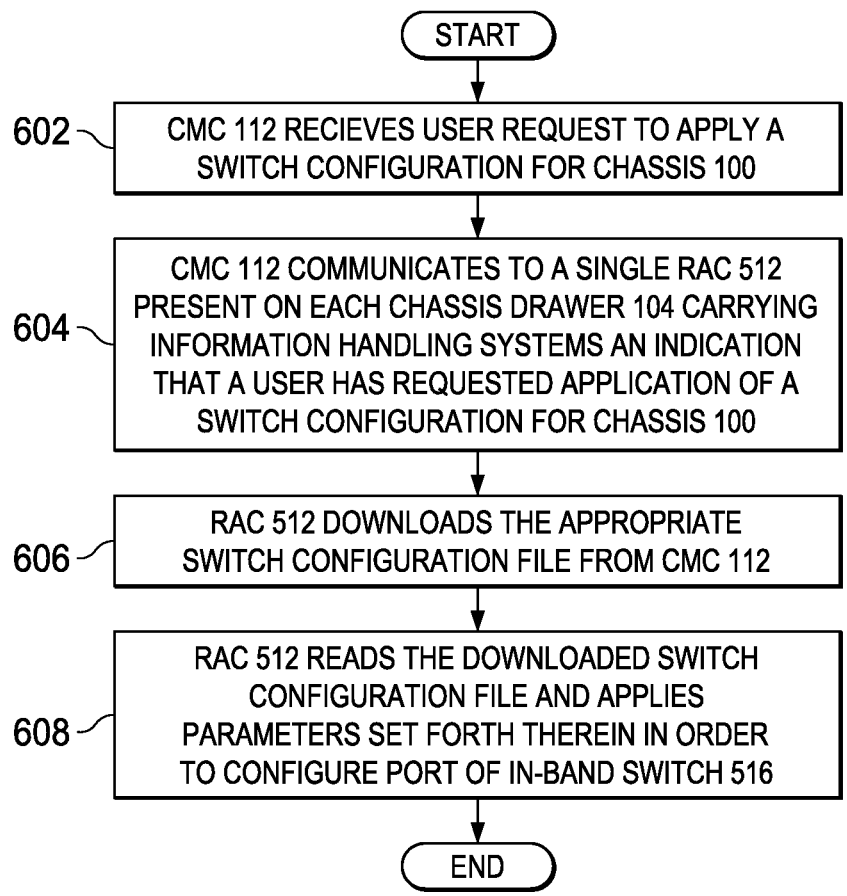
FIG. 6 illustrates a flow chart of an example method for configuring ports of an in-band switch, in accordance with embodiments of the present disclosure.

FIG. 6 illustrates a flow chart of an example method 600 for configuring ports of an in-band switch, in accordance with embodiments of the present disclosure. According to some embodiments, method 600 may begin at step 602. As noted above, teachings of the present disclosure may be implemented in a variety of configurations of chassis 100. As such, the preferred initialization point for method 600 and the order of the steps comprising method 600 may depend on the implementation chosen.

At step 602, CMC 112 may receive (e.g., from a remote management console communicatively coupled to CMC 112) a user request to apply a switch configuration for chassis 100.

At step 604, responsive to the user request, CMC 112 may communicate to a single RAC 512 present on each chassis drawer 104 carrying information handling systems (e.g., to information handling system 502a and not other information handling systems 502 of chassis drawer 104B) an indication that a user has requested application of a switch configuration for chassis 100. Such indication may include an IPMI over LAN command or other suitable command communicated between CMC 112 and the single RAC 512 via out-of-band switch 518.

At step 606, responsive to the indication received from CMC 112, a RAC 512 may download the appropriate switch configuration file from CMC 112. Such download may be performed using trivial file transfer protocol (TFTP), IPMI over LAN, or other suitable protocol or standard for file transfer. Such switch configuration file may be one of one or more switch configuration files stored on storage media 524. Each switch configuration file may include parameters relating to port configurations of elements (e.g., network interfaces 508, in-band switch 516, external network interface 530, etc.) in a network communication path. Such switch configuration files may be provided to storage media 524 by a manufacturer, vendor, or other provider of chassis 100, and/or may be stored to storage media 524 by a user. The download described with respect to step 606 may be performed by a single RAC 512 on each chassis drawer 104 within chassis 100 that includes at least one RAC 512.

At step 608, RAC 512 may read the downloaded switch configuration file and apply parameters set forth therein in order to configure ports of in-band switch 516. The application of parameters described with respect to step 608 may be performed by a single RAC 512 on each chassis drawer 104 within chassis 100 that includes at least one RAC 512.

Port configuration for other elements of chassis 100 (e.g., external network interface 530) in accordance with the user-requested configuration may be applied to such components by CMC 112.

Although FIG. 6 discloses a particular number of steps to be taken with respect to method 600, method 600 may be executed with greater or fewer steps than those depicted in FIG. 6. In addition, although FIG. 6 discloses a certain order of steps to be taken with respect to method 600, the steps comprising method 600 may be completed in any suitable order.

Method 600 may be implemented using CMC 112, a remote access controller 512, and/or any other system operable to implement method 600. In certain embodiments, method 600 may be implemented partially or fully in software and/or firmware embodied in computer-readable media and executable on a processor of an information handling system.

Although the present disclosure has been described in detail, it should be understood that various changes, substitutions, and alterations can be made hereto without departing from the spirit and the scope of the disclosure as defined by the appended claims.

What is claimed is:

1. A chassis comprising:
   a plurality of slots;
   a plurality of drawers corresponding to the plurality of slots, each of the plurality of drawers having:
   an interface connector coupling the drawer to a midplane;
   an in-band switch coupled to the interface connector;
   an out-of-band switch coupled to the interface connector; and
   a plurality of information handling systems, each of the plurality of information handling systems including:
   a processor;
   a first network interface coupled to the processor and to the in-band switch; and
   a remote access controller (RAC), said RAC comprising a RAC processor, a RAC memory, and a second network interface, wherein the second network interface is coupled to the out-of-band switch;
   wherein each slot is configured to electrically and communicatively couple the corresponding drawer to other components of the chassis; and
   a chassis controller communicatively coupled to each of the plurality of slots and configured to:
   receive a user request to apply a switch configuration;
   communicate via the out-of-band switch to a particular remote access controller of a particular drawer disposed in the plurality of slots an indication that a user has requested application of a switch configuration;
   receive, in response to the indication, a request to download a switch configuration file from the chassis controller to the particular remote access controller; and
   transfer, in response to the request to download the switch configuration file, the switch configuration file to the particular remote access controller such that the particular remote access controller applies parameters set forth in the switch configuration file in order to configure the in-band switch associated with the drawer comprising the remote access controller.

2. The chassis of claim 1, wherein the chassis controller is a chassis management controller.

3. The chassis of claim 1, wherein the switch configuration file is selected from a plurality of switch configuration files stored on a computer-readable medium associated with the chassis controller.

4. The chassis of claim 1, wherein the particular remote access controller applies parameters set forth in the switch configuration file in order to configure switching of ports of the in-band switch.

5. A method comprising, in a chassis having a plurality of slots and a plurality of drawers corresponding to the plurality of slots, each drawer including an interface connector coupling the drawer to a midplane, an in-band switch coupled to the interface connector, and an out-of-band switch coupled to the interface connector, and a plurality of information handling systems, each information handling system including a processor, a first network interface coupled to the processor and to the in-band switch, and a remote access controller (RAC), said RAC comprising a RAC processor, a RAC memory, and a second network interface, wherein the second network interface is coupled to the out-of-band switch, wherein each slot is configured to electrically and communicatively couple the drawer to other components of the chassis:
    receiving, by a chassis controller integral to the chassis, a user request to apply a switch configuration;
    communicating from the chassis controller to a remote access controller via an out-of-band switch of the drawer an indication that a user has requested application of a switch configuration;
    receiving at the chassis controller, in response to the indication, a request to download a switch configuration file from the chassis controller to the remote access controller; and
    transferring from the chassis controller, in response to the request to download the switch configuration file, the switch configuration file to the remote access controller such that the remote access controller applies parameters set forth in the switch configuration file in order to configure the in-band switch.

6. The method of claim 5, wherein the chassis controller is a chassis management controller.

7. The method of claim 5, further comprising selecting the switch configuration file from a plurality of switch configuration files stored on a computer-readable medium associated with the chassis controller.

8. The method of claim 5, wherein the remote access controller applies parameters set forth in the switch configuration file in order to configure switching of ports of the in-band switch.

9. A drawer configured to removably engage with a corresponding slot of a chassis, wherein the slot is configured to receive the drawer and to electrically and communicatively couple the drawer to other components of the chassis, the drawer comprising:
    an interface connector coupling the drawer to a midplane;
    an in-band switch, coupled to the interface connector, for switching network traffic between each of a plurality of information handling systems and a network external to the chassis;
    an out-of-band switch, coupled to the interface connector;
    wherein each of the plurality of information handling systems includes:
        a processor coupled to a first network interface coupled to the in-band switch; and
        a remote access controller (RAC), said RAC comprising a RAC processor, a RAC memory, and a second network interface, wherein the second network interface is coupled to the out-of-band switch and configured to:
            receive from a particular remote access controller in the drawer an indication that a user has communicated to the chassis controller a request to apply a switch configuration;
            download, in response to the indication, a switch configuration file from the chassis controller to the particular remote access controller; and
            apply parameters set forth in the switch configuration file in order to configure the in-band switch for communication.

10. The drawer of claim 9, wherein the chassis controller is a chassis management controller coupled to the in-band switch and the out-of-band switch.

11. The drawer of claim 9, wherein the switch configuration file is selected from a plurality of switch configuration files stored on a computer-readable medium associated with the chassis controller.

12. The drawer of claim 9, wherein applying parameters set forth in the switch configuration file comprises applying parameters set forth in the switch configuration file in order to configure switching of ports of the in-band switch.

13. A method comprising, in a drawer configured to removably engage with a slot of a chassis, wherein the slot is configured to receive the drawer and to electrically and communicatively couple the drawer to other components of the chassis and wherein the drawer comprises:
    an interface connector coupling the drawer to a midplane;
    an in-band switch, coupled to the interface connector, for switching network traffic between each of a plurality of information handling systems and a network external to the chassis;
    an out-of-band switch, coupled to the interface connector; and
    each of the plurality of information handling systems includes:
        a processor and a first network interface coupled between the processor and an in-band switch; and
        a remote access controller (RAC), said RAC comprising a RAC processor, a RAC memory, and a second network interface, wherein the second network interface is communicatively coupled to the out-of-band switch and the in-band switch, the method comprising:
    receiving from a controller integral to the chassis and external to the drawer an indication that a user has communicated to the chassis controller a request to apply a switch configuration;
    downloading, in response to the indication, a switch configuration file from the chassis controller to the particular remote access controller; and
    applying parameters set forth in the switch configuration file in order to configure the in-band switch for communication.

14. The method of claim 13, wherein the chassis controller is a chassis management controller coupled to the in-band switch and the out-of-band switch.

15. The method of claim 13, wherein the switch configuration file is selected from a plurality of switch configuration files stored on a computer-readable medium associated with the chassis controller.

16. The method of claim 13, wherein applying parameters set forth in the switch configuration file comprises applying parameters set forth in the switch configuration file in order to configure switching of ports of the in-band switch.

\* \* \* \* \*